March 6, 1962 D. W. FORD 3,024,391

LOAD PROTECTIVE CIRCUIT

Filed Jan. 6, 1956 2 Sheets-Sheet 1

INVENTOR.
DAVID W. FORD
BY Moody and Goldman
ATTORNEYS

INVENTOR.
DAVID W. FORD
BY Moody and Goldman
ATTORNEYS

United States Patent Office 3,024,391

Patented Mar. 6, 1962

3,024,391

LOAD PROTECTIVE CIRCUIT

David W. Ford, Cedar Rapids, Iowa, assignor to Collins Radio Company, Cedar Rapids, Iowa, a corporation of Iowa Filed Jan. 6, 1956, Ser. No. 557,711
6 Claims. (Cl. 317—149)

This invention relates to a binary demodulation circuit that is capable of handling signals which may vary widely in frequency and/or amplitude.

Decoding circuits of the type concerned herein are used to demodulate tone signals. Each tone signal is binary modulated by sequencing the tone signal off and on. Decoder circuits of the type concerned herein are often used in multiplex transmission systems that transmit a large plurality of different tones on a given carrier frequency.

The tones are generated in a multiplex transmitter at a constant amplitude with discrete frequency separation. Any number of tones may be generated at one instant up to a maximum number, which depends on the design of the particular transmitter. Thus, at any one time, a single tone, a few tones, or a very large number of tones might be generated and transmitted.

A difficulty encountered, when a large number of tones is generated, is that there will be periodically occurring instances when the amplitudes of most or all of the tones will be simultaneously maximum to accordingly provide at that instant, a very large total amplitude, called herein a "phase build-up" which will overdrive a modulated carrier to cause the output to have much wider side-bands than is permissible. Consequently, unless precautions are taken, the instantaneous phase build-ups may cause undue "splatter" beyond an assigned transmission band-width.

In order to prevent "splatter," the combined tone signals are provided to a tone compressor, which maintains a substantially constant output signal. As a result, the component tone signals vary in amplitude at the output of the tone compressor according to the number of tone signals being generated at the instant. Consequently, the amplitude of a particular signal is small when it occurs simultaneously with a large number of other signals, and vice versa. In this manner, the transmitted wave is maintained within its assigned band-width.

It can then be realized that a particular demodulating circuit, which demodulates only a single tone, must contend with great variations in tone amplitude which are completely independent of signal fading effects. The amplitude might vary at the compressor output, for example, from one volt when it is the only tone being transmitted, to perhaps 50 millivolts when twenty-five tones are being simultaneously transmitted. Hence, this example assumes a twenty to one amplitude variation in the signal even before it is transmitted.

Often a tone signal is demodulated by a relay, which is a binary device that is actuated one way when the tone signal is received, and is actuated the opposite way when the tone signal is not received. Relays are devices that cannot contend with large current variation. If the actuating current is too small, the relay will not be actuated; and if, on the other hand, the actuating current is too large, the relay will be burned out or damaged. Many relays cannot operate with more than a four-to-one current variation, which is many times smaller than the current variation caused by the tone compressor. Accordingly, it is essential that the relay actuating current be maintained at a relatively constant magnitude that does not substantially vary to the extreme variations in the amplitude of the received tone signal.

This invention provides current-regulating means for a relay, wherein a demodulated direct-current signal of substantially constant amplitude is provided to a relay in response to a received alternating tone signal.

The demodulation circuit of the invention provides a high-resistance input; which permits this invention to be used as the demodulating circuit for any of a wide variety of tone signal frequencies, that might be within the range from one to 100 kilocycles, for example.

The demodulation circuit of this invention may be used either in receiving equipment or in transmitter monitoring apparatus. The embodiment described herein will assume a transmitter monitoring use, however.

It is, accordingly, an object of this invention to provide a demodulating circuit for binary coded signals that will obtain a substantially constant direct-current demodulated output, although the input signal varies widely in amplitude.

It is another object of this invention to provide a demodulation circuit that maintains a high input resistance.

It is still another object of this invention to provide a circuit that will obtain a substantially constant direct-current output to a load, although there is wide variation in the frequency of its input signal.

The invention utilizes a two-stage amplification system wherein a combined series-parallel plate impedance is connected to the plates of both amplifiers; and a load impedance, which might be a relay, is connected as one of the parallel impedances. The first stage is operated in a combined class A and AB manner, which will be explained below; while the second stage is operated either class B or, more preferably, class C. The first stage is operated degeneratively by means of a partially unbypassed cathode resistor, wherein the capacitance across the resistor is not intended for bypassing purposes, but only to maintain a zero phase-shift characteristic in the plate circuit of the first stage to prevent capacitive components in its plate circuit from lowering the input resistance of the first stage, which would disturb the selectivity of a filter connected at the input. Another capacitor is used across the plate of the second stage to prevent alternating-current feedback and its resulting loss in gain; however, this capacitor assists in providing direct-current feedback, which enables a saturation characteristic of the invention to be controlled by a common series resistor. The load impedance is connected in the plate circuit of the second stage.

Further objects, features and advantages of this invention will be apparent to a person skilled in the art upon further study of the specification and drawings, in which.

Figure 1:
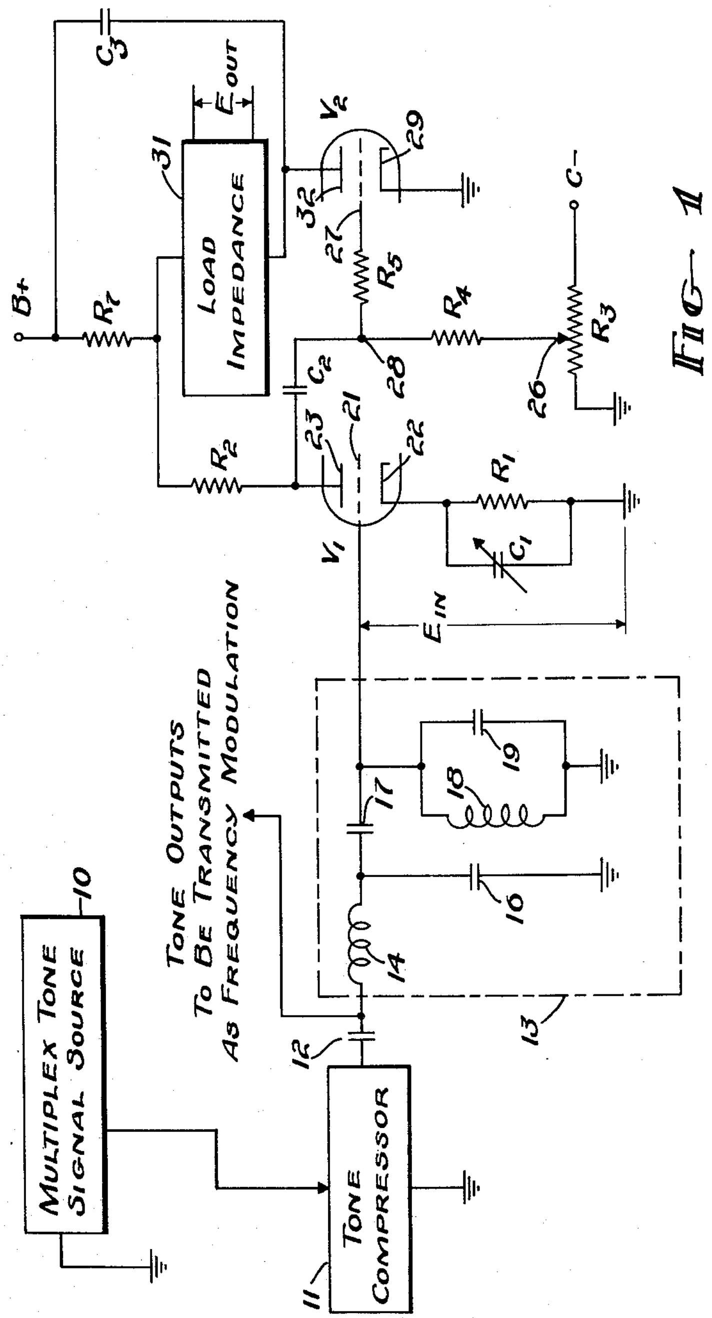
FIGURE 1 shows a schematic diagram of a system using the invention.

Now referring to the invention in more detail, FIGURE 1 shows it used as a monitor element in a multiplex frequency-modulating transmitter. The transmitter includes a multiplex tone-signal source 10, which generates a large plurality of tone signals, wherein each has a different frequency assigned to it. These tone signals may extend in the audio and super-audio frequency range with predetermined frequency spacings. Each of the tones provides on and off binary information.

A tone compressor 11 receives the generated tone-signals from source 10, combines them into a unitary signal, and maintains the unitary signal at a substantially constant-peak amplitude without distorting the component signals. Thus, at the maximum instantaneous amplitude of the combined tones, a given ampliutde will not be exceeded at the output of compressor 11. Tone compressor 11 may use automatic-volume-control principles, although it should have substantially faster response than is ordinarily used with automatic-volume-control circuits.

After compression of the tones to maintain the output of the combined waves within a given amplitude limit, they may be used to modulate a carrier frequency without danger of causing a predetermined band-width to be exceeded. A blocking capacitor 12 is serially connected to the output of tone compressor 11 to remove any direct-current component.

Monitoring apparatus is provided with the transmitter to monitor each of the tone signals. Thus in FIGURE 1, the circuit to the right of capacitor 12 monitors one of the tone signals. A filter 13 is connected to the output of compressor 11 and passes a selected tone signal for monitoring. Filter 13 might, for example, pass a tone signal of 15 kilocycles and may be a double-tuned filter. An inductor 14 and a capacitor 16 provide a series-resonant portion. Another capacitor 17 couples the first filter portion to a parallel-resonant portion, which includes an inductor 18 and a capacitor 19.

The invention provides a demodulation circuit that connects to the filter's output and receives a tone signal $E_{in}$ which is varied widely in amplitude by compressor 11.

A first triode $V_1$ has its control grid 21 connected to the output of filter 13 to receive the selected tone signal. A resistor $R_1$ is connected between the cathode 22 of triode $V_1$ and ground; and a capacitor $C_1$ connects across resistor $R_1$. Capacitor $C_1$ is not a bypassing capacitor, but has a value of capacitance that is generally too small to provide a substantial bypassing effect. Rather, capacitor $C_1$ is adjusted to prevent phase-shift at the input to tube $V_1$. Cathode resistor $R_1$ is made sufficiently large to provide degeneration or negative feedback for triode $V_1$, and also biases tube $V_1$ for a combined state of Class A and AB operation, which will be further explained below. A plate resistor $R_2$ is connected at one end to the plate 23 of triode $V_1$.

A coupling capacitor $C_2$ has one end connected to the plate 23 of triode $V_1$; and a resistor $R_4$, having a large value of resistance, connects on one end to the other side of capacitor $C_2$. Resistor $R_4$ connects on its other end to the tap 26 of a potentiometer $R_3$, which has one end connected to ground and the other end connected to a negative direct-voltage supply, C-minus.

A second triode $V_2$ has its control grid 27 connected to one end of a resistor $R_5$ which has its opposite end connected to point 28 that is common to capacitor $C_2$ and resistor $R_4$. The cathode 29 of triode $V_2$ may be connected to ground.

The plate loads of tubes $V_1$ and $V_2$ are connected in a combined series-parallel manner, which includes a load impedance 31, which might be a relay. Impedance 31 is connected on one side to the plate 32 of triode $V_2$; and a resistor $R_2$ is connected on one side to the plate 23 of triode $V_1$. Impedance 31 and resistor $R_2$ are connected in parallel with respect to a series-resistance $R_7$ which connects at one end to both of them and connects at its other end to a B-plus voltage source. The embodiment of the invention regulates the direct-current component through load impedance 31, which manifests itself as a substantially constant direct-voltage $E_{out}$ across impedance 31, since it has a substantially fixed resistance.

A capacitor $C_3$ of large value is connected on one side to plate 32 of tube $V_2$ and is connected on its opposite side to the B-plus source, although it might instead connect between plate 32 and ground.

The tap 26 of potentiometer $R_3$ is adjusted so that tube $V_2$ is normally biased below cutoff to thus maintain it in class C operation.

Cathode capacitor $C_1$, which is connected across resistor $R_1$ is not a conventional bypass capacitor, as it may appear, but has a totally different function. It is used to prevent capacitively-reactive components in the plate circuit of tube $V_1$ from being reflected into its grid circuit as a resistive component, which would adversely affect operation of the circuit. Thus, a very large input resistance is obtained which permits a particular design of the invention to be used in connection with any one of many filters that may be tuned to any frequency within a large range, which might, for example, extend from one to one-hundred kilocycles per second. Only a slight amount of tuning may be necessary after the filter is inserted. Thus, capacitor $C_1$ is proportioned to maintain a substantially zero phase-angle $\phi$ between the plate-current and plate-voltage of tube $V_1$.

The well known reflected resistance component, $R'$, is defined by the following formula:

$$R' = -\frac{1}{2\pi f C_{gp} A \sin \phi} \quad (1)$$

where $f$ is the operating frequency, $C_{gp}$ is the grid-to-plate interelectrode capacitance of tube $V_1$, $A$ is the gain of tube $V_1$, and $\phi$ is the phase-angle between the plate-current and the plate-voltage of tube $V_1$. The reactance of capacitor $C_1$ appears in the plate circuit of tube $V_1$ as an inductive reactance which cancels the capacitive reactance existing there and maintains an in-phase relationship between the plate-current and the plate voltage.

If phase-angle $\phi$ is not zero, a decrease in the input resistance of tube $V_1$ results that loads filter 13 and decreases its selectivity. Good selectivity or Q is essential to proper operation of a circuit of the type described herein.

When capacitor $C_1$ is adjusted as described above, it will generally have a relatively small value which may be insufficient to provide a substantial bypass of resistor $R_1$ for alternating components, depending of course on the frequency involved. Consequently, resistor $R_1$ provides a degenerative effect to tube $V_1$, almost as if resistor $R_1$ were not shunted by any capacitor; and tube $V_1$ also has its input resistance further increased by cathode follower action. Therefore, the large input resistance of tube $V_1$ does not substantially load filter 13 which then maintains its selectivity.

The capacitive component reflected into the grid circuit of tube $V_1$ is absorbed by filter 13 when it is tuned after insertion and, therefore, has no harmful effects in the embodiment of the invention.

Although compressor 11 may generate all of the tone signals with equal amplitude, it will be realized that the amplitude of voltage $E_{in}$ provided at the output of filter 13 will vary widely, since it is directly affected by the number of tone signals provided to compressor 11. For example, $E_{in}$ may have a peak value of 100 millivolts when twenty tone signals are being provided to compressor 11, and may have a peak amplitude of one volt when only one tone signal $E_{in}$ is provided to compressor 11. Consequently, input voltage $E_{in}$ will fluctuate greatly in amplitude within the transmitter circuitry.

Cathode resistor $R_1$ is chosen to statically bias tube $V_1$ at a point above the cutoff voltage of the tube, which need not be in a linear region of the tube characteristic and generally will be greater than the bias used for class A operation. Tube $V_1$ primarily operates class A, but in the case of an exceptionally large input signal will operate class AB.

Figure 2:
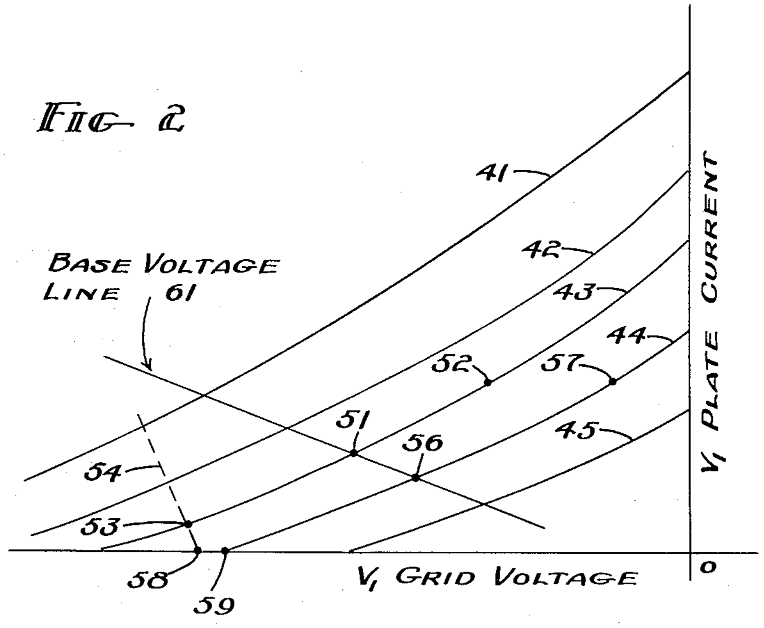
FIGURE 2 illustrates the operating characteristic of one of the electron tube stages in the invention.

FIGURE 2 illustrates the dynamic operation of tube $V_1$. As a result of a direct-voltage type of feedback from tube $V_2$, tube $V_1$ will operate over a range of dynamic characteristic curves, such as curves 41, 42, 43, 44, and 45 in FIGURE 2. The particular dynamic curve which is used at any one time will depend upon the amplitude of the input signal.

When an alternating signal is received on grid 21 of tube $V_1$ it will be transmitted to grid 27 of tube $V_2$, after a regulating process, which is described below. Then, the signal will actuate tube $V_2$ in class C fashion, due to the bias provided by tap 26 to the grid of tube $V_2$ to provide pulses of plate-current for tube $V_2$.

The pulses of plate-current in tube $V_2$ will charge capacitor $C_3$, which is large in value; and between pulses, capacitor $C_3$ will discharge through load impedance 31 and resistor $R_7$ to obtain a substantially smooth direct-current flow through load impedance 13 and resistor $R_7$.

The time-constant of resistor $R_7$, load impedance 31, and capacitor $C_3$ will be relatively large; and the direct-current level will change relatively slowly, although sufficiently fast to follow changes in the amplitude of the sine-wave input to tube $V_1$.

The direct-voltage drop across resistor $R_7$ determines the plate voltage level applied to tube $V_1$ and provides the direct-voltage feedback from tube $V_2$ to tube $V_1$.

It can be realized that an increase in alternating signal amplitude at the input to tube $V_1$ will result in some increase of plate-current through resistor $R_7$, which in turn will decrease the plate voltage of tube $V_1$ to cause the output of tube $V_2$ to decrease accordingly. This situation provides a saturating effect for the direct-current in the plate circuit of tube $V_2$, wherein the increase of plate-current of tube $V_2$ is slight compared to a very large increase in input signal.

The saturation effect can perhaps be better understood by using FIGURE 2, which illustrates the operation of tube $V_1$ under the above described direct-current feedback situation. At a particular level of input signal, tube $V_1$ will operate on a particular dynamic curve, such as curve 43 in FIGURE 2. The bias voltage on tube $V_1$ will be a function of its plate voltage, since the bias is established by plate current flow through resistor $R_1$; and in such instant, the bias may be indicated by point 51 in FIGURE 2. It will be assumed, under these operating conditions, that the alternating-input signal has a positive peak value indicated by point 52 and a negative peak value indicated by point 53 in FIGURE 2. Due to the phase-reversal which occurs between the grid and plate of tube $V_1$, the positive peak voltage presented at the grid of tube $V_2$ is determined by negative peak of the input signal which is represented by point 53 in FIGURE 2.

The positive half-cycle of voltage presented to the grid of tube $V_2$, will be distorted and flattened on its peak by the nonlinearity in the lower portions of the dynamic curves in FIGURE 2. The reference level of this positive half-cycle is determined primarily by two factors which are the bias on tube $V_2$ and the alternating-current axis of the wave appearing to tube $V_2$. The alternating-current axis will not occur at the same instances as the alternating-current axis of the input signal provided to tube $V_2$, because of the distortion of waveform in tube $V_1$ and blocking capacitor $C_2$. The shift in these axes works against the saturation qualities of the invention but is compensated by the direct-current feedback of the invention.

Let it now be assumed that the alternating input signal increases in amplitude, which would cause tube $V_2$ to have a slightly higher plate current, that in turn will cause more voltage-drop across resistor $R_7$, resulting in the direct-current feedback voltage which lowers the plate voltage of tube $V_1$ and causes it to operate along another dynamic curve such as curve 44 in FIGURE 2.

The self-bias of tube $V_1$ decreases in value, because the lower plate voltage decreases the current through cathode biasing resistor $R_1$, and is indicated by point 56 on dynamic curve 44. The increased input signal operates along dynamic curve 44 between peak points 57 and 58. However, when the input signal reaches point 59, it will be clipped, which will provide the positive peak to the grid of tube $V_2$. The decrease in bias, together with the flattening distortion in the lower dynamic curve region, results in the saturation characteristic of the invention, and substantially compensates for the shift in the alternating axis of the wave presented to tube $V_2$. It will be found that under varying input signal conditions, a bias voltage line 61 in FIGURE 2 will be established with respect to the dynamic operating curves; and also, an output peak limit is indicated by line 54 together with the zero abscissa to the right of line 54 in FIGURE 2, which provides clipping. Whether dotted line 54 or the zero abscissa represents the negative input signal peaks, saturation is obtained. As the input signal varies in amplitude, it will operate class A with small signals and class AB with larger signals that have their negative peaks driven below cutoff.

As the signal level changes, the distortion in the output of tube $V_1$ varies. This distortion affects the output alternating-current axis, but otherwise is unimportant, since it is a direct-current component that is utilized by load impedance 13 and not the waveform of the alternating component.

A large average negative bias on tube $V_1$ permits large input signals to be utilized, since large input signals then would not drive tube $V_1$ above the point where grid current is drawn, which would lower the input resistance of the tube and disturb the selectivity of a connected filter.

Figure 3:
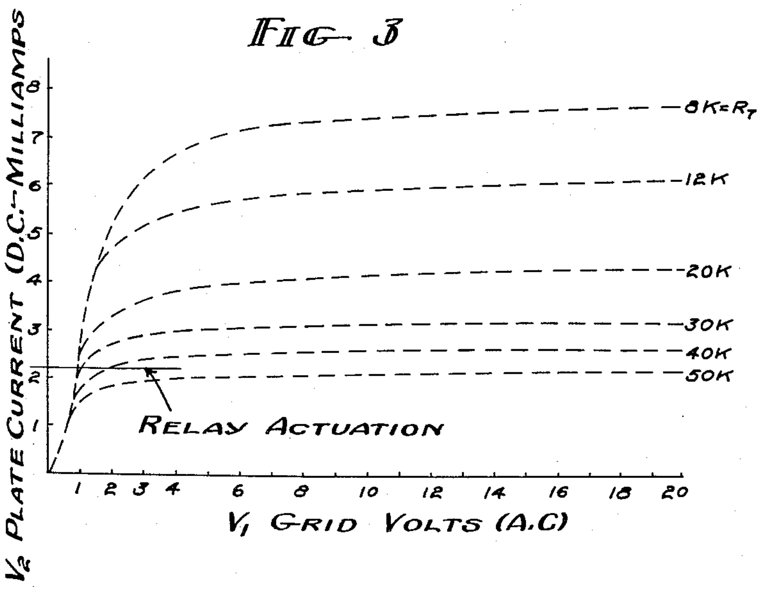
FIGURE 3 illustrates a diagram showing the input-output operating characteristic of the invention.

It is series resistor $R_7$ which primarily controls the saturation level of direct-current through load impedance 31. FIGURE 3 illustrates the effect of choosing various values for resistor $R_7$ in a particular model of the invention. It is noted that saturation occurs at a low input signal level, and is maintained as the signal level increases many times. Accordingly, the value of the limited output direct-current of the invention can be easily controlled by varying the value of a single resistor which is $R_7$.

A practical limit is obtained for some uses of the invention when the input signal level begins to drive the grid of tube $V_1$ positive, because grid current then occurs which lowers the input impedance of the circuit to affect the selectivity of an attached filter. However, the current saturation qualities of the invention are maintained even after the input signal drives tube $V_1$ positively.

It is all of the above operational factors in combination, which provide the characteristics of this invention, and they may be obtained with the following component values when tubes $V_1$ and $V_2$ are triode-halves of a 5670 vacuum tube, capacitor $C_1$ is 82 mmf., capacitor $C_2$ is 0.22 mf., capacitor $C_3$ is 0.22 mf., resistor $R_1$ is 4.7 kilohms, resistor $R_2$ is 39 kilohms, potentiometer $R_3$ is 5 kilohms; resistor $R_4$ is 220 kilohms, resistor $R_5$ is 68 kilohms, resistor $R_7$ is 8.0 kilohms, and the demodulation impedance is 8 kilohms.

The saturation direct-current through load impedance 13 may be set at any value between about 7 to 2 milliamperes by varying resistor $R_7$ from 8.0 to 50 kilohms, respectively. FIGURE 3 illustrates how the value of resistor $R_7$ affects the value of the saturation current provided by the invention. An example of the current level required for relay actuation is also shown in FIGURE 3.

It is, therefore, apparent that the invention provides a circuit that will maintain a direct-current at a substantially constant value, while an alternating input voltage is varying greatly in amplitude. It is further apparent that the invention maintains a very high input resistance that does not interfere with the selectivity of a filter connected to its input.

While a particular form of the invention has been shown and described, it is understood that the invention is capable of modification. Changes, therefore, in its construction and arrangement may be made without departing from the full scope of the invention as defined by the appended claims.

I claim:

1. A circuit having a load protective characteristic with respect to a widely varying alternating-current input signal, comprising first and second triodes, each having a plate, grid and cathode, a cathode biasing resistor connected between ground and the cathode of said first triode, a capacitor connected across said cathode resistor and adjusted to suppress reactive components in the plate circuit of said first triode, the grid of said second triode being capacitance-resistance coupled to said first triode, said second triode biased below its cutoff voltage, a plate resistor connected at one end to the plate of said first triode, a load being connected on one side to the plate of said second triode, a common resistor having one end connected to the other end of said plate resistor and to the other side of said load, a B-plus voltage supply connected between ground and the other side of said common resistor, and a large capacitor connected at one end to the plate of said second triode and at the other end to the B-plus connected end of said common resistor, whereby signal-induced current through said load remains substantially constant although said alternating signal received at the control grid of said first tube varies widely in amplitude and frequency.

2. Means for translating a widely varying alternating-current signal into a substantially constant amplitude demodulated signal, comprising a first electron control means having at least three control elements receiving said alternating current signal on its control electrode, a cathode-biasing resistor connected between ground and the cathode of said first electron control means, a plate resistor connected at one end to the plate of said first electron control means, a second electron control means having at least three control elements having its control electrode capacitance-resistance coupled to the plate of said first electron control means, and its cathode connected to ground, said second electron control means, biased for class C operation, a load connected on one side to the plate of said second electron control means, a common resistor having one end connected to both the remaining end of said plate resistor and the remaining side of said load, a grounded plate-voltage source connected to the other end of said common resistor, and a capacitor connected between said source and the plate of said second electron control means, the time-constant of said capacitor with said common resistor and said load being long compared to a cycle of said alternating-current signal, whereby a substantially constant amplitude demodulated voltage is provided across said load while said alternating signal is provided.

3. Means for translating an alternating input signal into a substantially constant direct-current across a load, although the amplitude of said input signal varies in an extreme manner, comprising first and second triode tubes, a cathode resistor connected between ground and the cathode of said first triode to bias it for class A operation as the input signal amplitude varies over a wide range, said biasing resistor providing degeneration for said first tube to prevent it from drawing grid current during large input signal excursions, a plate resistor connected at one end to the plate of said first tube, a saturation controlling resistor connected serially to the other end of said plate resistor; a coupling capacitor connected at one end to the plate of said first triode, a first grid resistor connected between the other side of said blocking capacitor and the control grid of said second triode, a potentiometer having one side connected to ground, a negative grounded direct voltage source connected to the other side of said potentiometer, a second grid resistor connected between the tap of said potentiometer and the common point between said blocking capacitor and said first grid resistor, the cathode of said second triode connected to ground and the tap of said potentiometer adjusted to bias said second triode at least to cutoff, a large capacitor connected on one side to the plate of said second triode, said load being connected at one end to the plate of said second triode, a common resistor connected at one end to both the opposite ends of said load and said plate resistor, and a capacitor connected across the biasing resistor of said first triode and adjusted in value to obtain substantial cancellation of reactive components in the plate circuit of said first triode, whereby the direct-voltage across said load remains substantially constant while the alternating-current input signal is applied, although said alternating current signal varies widely in frequency and amplitude.

4. Means for translating an input alternating-current signal of widely varying amplitude into a direct-current signal of substantially constant amplitude without deteriorating the selectivity of an input filter during wide variation of signal amplitude, comprising a first triode electron tube having its control grid connected to the output of said filter, a first resistor connected between ground and the cathode of said first tube to bias it, a second resistor connected at one end to the plate of said first triode, a first capacitor connected across said first resistor and adjusted to cause cancellation of the reactive components in the plate circuit of said first triode, said first capacitor being sufficiently small to obtain degenerative operation for said first resistor, a second triode electron tube having its cathode connected to ground, a third resistor connected as a voltage divider and having a tap providing a negative direct voltage, a second capacitor, and a fourth resistor respectively connected in series between the plate of said first triode and said tap, a grid resistor connected at one end to the control grid of said second triode and having its other end connected to the common point between said second capacitor and fourth resistor, a load connected on one side to the plate of said second triode, a current controlling resistor connected at one end to both the remaining end of said second resistor and the remaining side of said load, a grounded B-plus voltage source connected to the other side of said current controlling resistor, and a capacitor connected between the plate of said second triode and said B-plus source.

5. Means for translating an input alternating-current signal into a direct-current output which remains substantially constant to protect a relay load from wide amplitude variations of said signal, comprising a tuned filter for selecting said input signal, a first triode having its control grid connected to the output of said filter, a first resistor connected between ground and the cathode of said first triode, a first capacitor connected across said first resistor and having a value which maintains an in-phase relationship between the plate-current and plate-voltage of said first tube, wherein the input resistance to said first tube is maximized, a second resistor connected at one end to the plate of said first tube, a grounded B-plus source voltage, a current-controlling resistor connected between said B-plus source and the other end of said second resistor, a second triode having its cathode connected to ground, the grid of said second triode capacitance-resistance coupled to the plate of said first tube, means for biasing said second triode for class C operation, said relay load being connected on one side to the plate of said second triode and connected on its other side to the common point between said second resistor and said current-controlling resistor, a smoothing capacitor connected between the plate of said second triode and said B-plus supply voltage, said smoothing capacitor having a large time constant with said relay load-impedance and said current-controlling resistor, and the value of said current-controlling resistor primarily determining the value of the direct current through said relay load.

6. Means for translating a widely varying alternating input signal into a substantially constant direct-current signal through a relay load, comprising first and second triodes, a grounded B-plus voltage source and a grounded C-minus voltage source, a current-controlling resistance means connected on one side to said B-plus source, plate-resistance means connected between the plate of said first tube and the other side of said current-controlling resistance means, cathode-resistance means connected between ground and the cathode of said first triode to operate it degeneratively, capacitor means connected across said cathode-resistance means to substantially maintain the plate-voltage and plate-current of said first tube in-phase, said second triode having its cathode connected to ground and its control grid capacitance-resistance coupled to the plate of said first triode, the control grid of said second triode operably connected to said C-minus source to bias said second tube at least to cutoff, said relay load being connected between the plate of said second triode and the common point between said plate-resistance means and said current-controlling resistance means, a smoothing capacitor connected between the plate of said second triode and said B-plus source, said smoothing capacitor providing a time-constant in conjunction with said load means and said current-controlling resistance means that is large compared to a cycle of alternating input signal, and the amplitude of direct-current through said relay load being controlled by adjusting the resistance value of said current-controlling resistance means.

References Cited in the file of this patent

UNITED STATES PATENTS

| | | |
|---|---|---|
| 2,269,694 | Schade | Jan. 13, 1942 |
| 2,533,251 | Hill | Dec. 12, 1950 |
| 2,646,925 | Bevis | July 28, 1953 |